US012219299B2

(12) United States Patent
Lee et al.

(10) Patent No.: US 12,219,299 B2
(45) Date of Patent: Feb. 4, 2025

(54) METHOD OF OPERATING ASSESSMENT DEVICE ASSESSING COLOR DISTORTION OF IMAGE SENSOR

(71) Applicant: SAMSUNG ELECTRONICS CO., LTD., Suwon-si (KR)

(72) Inventors: Jungmin Lee, Yongin-si (KR); Seunghyeok June, Suwon-si (KR); Jiyun Bang, Hwaseong-si (KR); Sungsu Kim, Yongin-si (JP); Joon-Seo Yim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 218 days.

(21) Appl. No.: 17/891,819

(22) Filed: Aug. 19, 2022

(65) Prior Publication Data
US 2023/0069744 A1 Mar. 2, 2023

(30) Foreign Application Priority Data

Aug. 26, 2021 (KR) .................. 10-2021-0113515
Mar. 25, 2022 (KR) .................. 10-2022-0037476

(51) Int. Cl.
*H04N 9/69* (2023.01)
*H04N 9/67* (2023.01)

(52) U.S. Cl.
CPC ............. *H04N 9/69* (2013.01); *H04N 9/67* (2013.01)

(58) Field of Classification Search
CPC ........... H04N 9/69; H04N 9/67; H04N 17/002
See application file for complete search history.

(56) References Cited

U.S. PATENT DOCUMENTS

| 5,293,543 | A | 3/1994 | Okabe |
| 7,075,633 | B2 | 7/2006 | Wegmann |
| 2015/0334295 | A1* | 11/2015 | Hinkel ................ H04N 23/617 |
| | | | 348/222.1 |
| 2019/0356814 | A1* | 11/2019 | Lee ...................... H04N 1/0001 |
| 2021/0208260 | A1 | 7/2021 | Song |
| 2021/0266504 | A1 | 8/2021 | Kim et al. |

(Continued)

FOREIGN PATENT DOCUMENTS

| JP | 2005-326323 A | 11/2005 |
| JP | 2011-47808 A | 3/2011 |
| KR | 10-1980755 B1 | 5/2019 |

OTHER PUBLICATIONS

Lee et al., "Color Image Distortion Assessment based on Synthetic Ground Truth Recovery", Samsung Electronics Co., Ltd, (5 pages total).

*Primary Examiner* — Mekonnen D Dagnew
(74) *Attorney, Agent, or Firm* — Sughrue Mion, PLLC

(57) ABSTRACT

Provided is a method of operating an assessment device which communicates with an image sensor and includes an input buffer and a processor, the method including receiving, by the input buffer, raw image data from the image sensor that is configured to capture a test chart, generating, by the processor, conversion image data based on color domain transformation of the raw image data, generating, by the processor, estimation image data by estimating a non-distorted image based on the conversion image data, and assessing, by the processor, color distortion of the image sensor based on the estimation image data and the conversion image data.

9 Claims, 13 Drawing Sheets

(56) References Cited

U.S. PATENT DOCUMENTS

2023/0100099 A1\* 3/2023 Saito .................. G06V 20/56
                                                    348/148
2024/0155091 A1\* 5/2024 Cui .................... H04N 23/83

\* cited by examiner

# METHOD OF OPERATING ASSESSMENT DEVICE ASSESSING COLOR DISTORTION OF IMAGE SENSOR

CROSS-REFERENCE TO RELATED APPLICATIONS

This application claims priority from Korean Patent Application Nos. 10-2021-0113515 filed on Aug. 26, 2021, and 10-2022-0037476 filed on Mar. 25, 2022, in the Korean Intellectual Property Office, the disclosures of which are incorporated by reference herein in their entireties.

BACKGROUND

Embodiments of the present disclosure described herein relate to an image sensor, and more particularly, relate to a method of operating an assessment device assessing color distortion of an image sensor.

An image sensor may sense a light reflected from an object to generate image data. The image data may include pixel values that are used to implement an environment, which is the same as or similar to a visual environment being perceived by a person, on a display device. In general, an image device may generate image data by using various image processing techniques including a remosaic technique of data passing through a color filter array (CFA) of a Bayer pattern. The processed image data may include various color distortions that are absent from a raw scene.

As a color distortion level increases, the quality of an image perceived by the person may decrease. In addition, because the color distortion reflects various factors such as a nature scene using an image sensor and a perception characteristic of the person, it may be difficult to assess the color distortion objectively and quantitatively. Accordingly, a method to assess the color distortion of the image sensor objectively and quantitatively is needed.

SUMMARY

One or more embodiments provide a method of operating an assessment device assessing color distortion of an image sensor.

According to an aspect of an embodiment, there is provided a method of operating an assessment device which communicates with an image sensor and includes an input buffer and a processor, the method including receiving, by the input buffer, raw image data from the image sensor that is configured to capture a test chart, generating, by the processor, conversion image data based on color domain transformation of the raw image data, generating, by the processor, estimation image data by estimating a non-distorted image based on the conversion image data, and assessing, by the processor, color distortion of the image sensor based on the estimation image data and the conversion image data.

According to another aspect of an embodiment, there is provided a method of operating an assessment device which is configured to communicate with an image sensor and includes an input buffer and a processor, the method including receiving, by the input buffer, raw image data from the image sensor that is configured to capture a test chart, generating, by the processor, replacement color information based on the raw image data and a reference chart, generating, by the processor, color reconstruction image data by reconstructing a color of the raw image data based on the replacement color information, and assessing, by the processor, color distortion of the image sensor based on the color reconstruction image data and the raw image data.

According to another aspect of an embodiment, there is provided a method of operating an assessment device which is configured to communicate with an image sensor and includes an input buffer and a processor, the method including receiving, by the input buffer, raw image data from the image sensor that is configured to capture a test chart, generating, by the processor, restored image data by restoring a false color or decolorization of the raw image data, and assessing, by the processor, color distortion of the image sensor based on the restored image data and the raw image data, wherein the test chart comprises a linear pattern in which probabilities of the linear pattern having a position, a length, and a slope are uniform and a probability of the linear pattern having a thickness exponentially decreases as the thickness of the linear pattern decreases.

According to another aspect of an embodiment, there is provided a test chart which is displayed on a physical medium and is used to assess color distortion of an image sensor, including a common region corresponding to a an entire area of the test chart, and a first linear pattern included in the entire area or a partial area of the common region, wherein, in lines of a first type corresponding to the first linear pattern, probabilities of the lines of the first type having a position, a length, and a slope are uniform, and a probability of the lines of the first type having a thickness exponentially decreases as the thickness of the lines of the first type decreases.

BRIEF DESCRIPTION OF DRAWINGS

The above and other objects and features of the present disclosure will become apparent by describing in detail embodiments thereof with reference to the accompanying drawings, in which:

FIG. 1 is a block diagram of an electronic device according to an;

DETAILED DESCRIPTION

Below, embodiments of the present disclosure will be described in detail and clearly to such an extent that one skilled in the art easily carries out the present disclosure. Embodiments described herein are example embodiments, and thus, the disclosure is not limited thereto.

Components described in the detailed description with reference to terms "part", "unit", "module", "layer", etc. and function blocks illustrated in drawings may be implemented in the form of software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
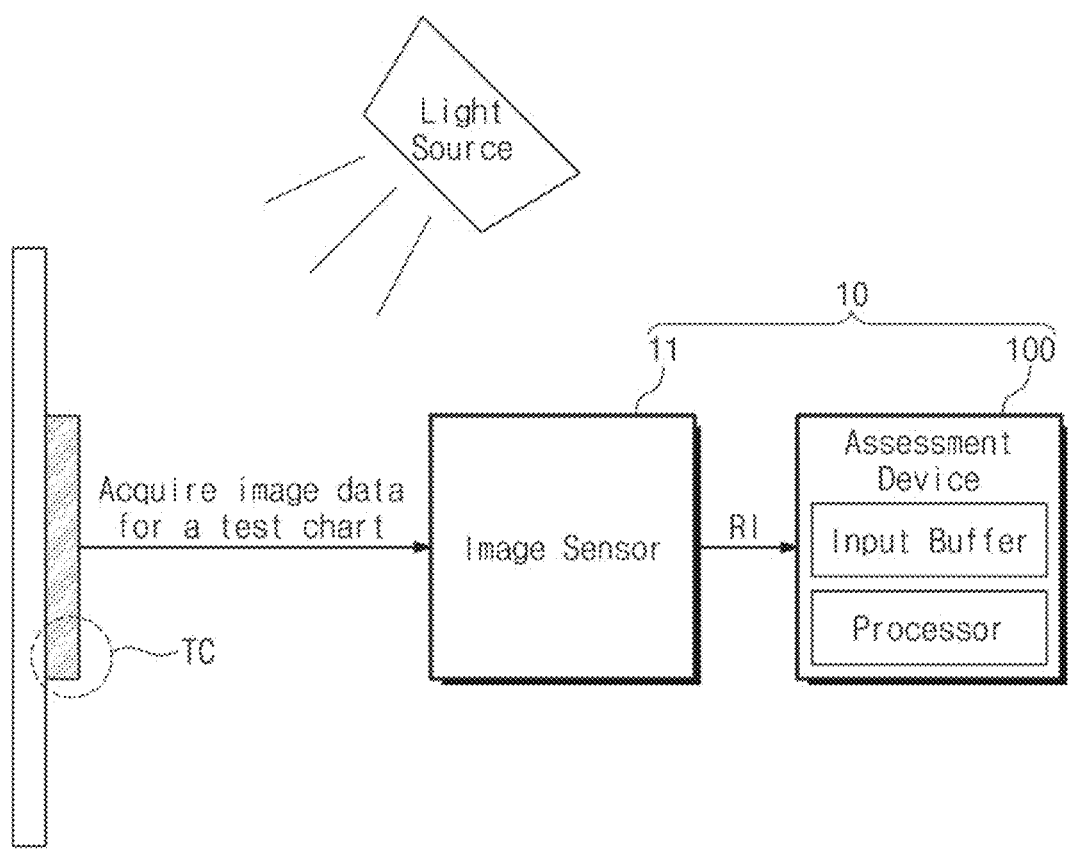

FIG. 1 is a block diagram of an electronic device according to an embodiment. An electronic device 10 is illustrated in FIG. 1. The electronic device 10 may be a device that detects a light reflected from an object and processes image data. For example, the electronic device 10 may be embedded in various types of electronic devices such as a smartphone, a tablet personal computer (PC), a laptop PC, and a wearable device.

Image data acquired by the electronic device 10 may include pixel values that are used to implement an environment, which is the same as or similar to a visual environment being perceived by the person, on a display device. The visual environment implemented based on the image data may be different from a visual environment that the person actually perceives.

For example, the electronic device 10 may apply various image processing techniques, which includes a remosaic technique of data passing through a color filter array (CFA) of a Bayer pattern, to the image, and the processed image data may include various color distortions that are absent from a raw scene. The color distortion may include, for example, a false color and decolorization. As a color distortion level increases, the quality of an image implemented by the image data may decrease.

According to an embodiment, a test chart TC that is used to assess the color distortion may be provided. In addition, a method of assessing a level of color distortion of the electronic device 10 by processing image data corresponding to the test chart TC may be provided.

The electronic device 10 may include an image sensor 11 and an assessment device 100. The image sensor 11 may acquire raw image data RI corresponding to the test chart TC. The image sensor 11 may provide the raw image data RI to the assessment device 100. For example, a light source may emit a light to the test chart TC. The image sensor 11 may acquire the raw image data RI corresponding to the test chart TC by detecting a light reflected from the test chart TC, convert the detected light into an electrical signal, and process the electrical signal. The raw image data RI may include the color distortion.

The test chart TC may be an object that is used to assess the color distortion such as a false color or decolorization in the image data. The false color may indicate that an arbitrary color occurs in the raw image data RI even though color except for brightness and luminance does not exist in an actual environment. The decolorization may indicate that a color in the raw image data RI is blurred or is expressed by a black color even though a color exists in an actual environment.

The test chart TC may include arbitrary colors or arbitrary lines such that objects with various colors and various shapes of an actual environment are reflected. Patterns included in the test chart TC may be used to assess a level of the color distortion of the electronic device 10 objectively and quantitatively.

In some embodiments, the test chart TC may be displayed on a physical medium and may be used to assess the color distortion of the image sensor 11. For example, the test chart TC may be provided in the form of a picture printed on a paper or may be displayed as an image on a display device. The image sensor 11 may capture the test chart TC as an object.

The test chart TC will be described in detail with reference to FIGS. 2, 3, and 7 together.

The assessment device 100 may include an input buffer and a processor. The input buffer may receive the raw image data RI corresponding to the test chart TC from the image sensor 11. The processor may assess a level of the color distortion of the image sensor 11 by analyzing the raw image data RI received from the image sensor 11 through the input buffer. For example, the assessment device 100 may include a non-transitory storage medium that stores instructions, and the processor may perform a series of operations for assessing a level of the color distortion of the image sensor 11 by executing the instructions stored in the non-transitory storage medium.

The level of the color distortion assessed by the assessment device 100 may be used to decrease the color distortion and to improve an image quality by enhancing an image sensor in the research and development stage. In addition, the assessed level may be used for the user to assess and check a color distortion level of an image sensor in the actual use stage.

A method of assessing a level of the false color will be described in detail with reference to FIGS. 4, 5, and 6 together. A method of assessing a level of the decolorization will be described in detail with reference to FIGS. 8 and 9 together.

However, an implementation example of the assessment device 100 is not limited to the example illustrated in FIG. 1, and the assessment device 100 may be implemented by hardware, software, or a combination thereof, which performs operations for assessing the false color level. The assessment device 100 may be implemented on a module such as the image sensor 11, may be implemented on a processor that may process image data acquired from the image sensor 11, or may be implemented on a separate electronic device communicating with an electronic device including the image sensor 11. The implementation example of the assessment device 100 will be described in detail with reference to FIG. 13.

Figure 2:
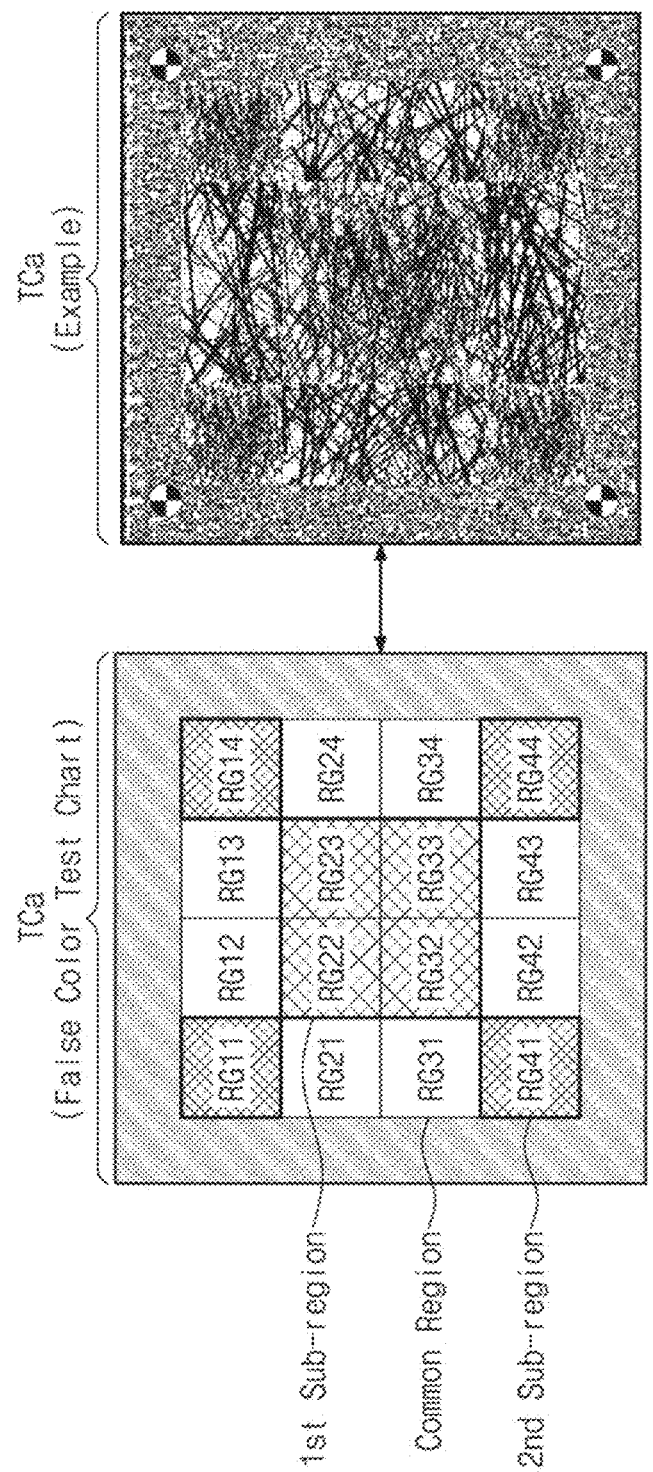
FIG. 2 is a diagram describing a test chart of FIG. 1 according to some embodiments.

FIG. 2 is a diagram describing a test chart of FIG. 1 according to some embodiments. A design example and an implementation example of a test chart TCa will be described with reference to FIGS. 1 and 2. The test chart TCa may be used to assess the false color. The test chart TCa may be expressed by a combination of white and black. The test chart TCa may correspond to one of examples of the test chart TC of FIG. 1.

The design example of the test chart TCa describes a method of designing the test chart TCa. The implementation example of the test chart TCa illustrates the test chart TCa implemented as an example. The design example of the test chart TCa and the implementation example of the test chart TCa may correspond to each other.

The test chart TCa may include a plurality of regions RG11, RG12, RG13, RG14, RG21, RG22, RG23, RG24, RG31, RG32, RG33, RG34, RG41, RG42, RG43, and RG44 arranged in a row direction and a column direction. For better understanding of the present disclosure, an example in which the test chart TCa includes 4 rows and 4 columns is illustrated, but embodiments are not limited thereto. In the test chart TCa, the number of rows and the number of columns may increase or decrease independent of each other.

In some embodiments, the test chart TCa may include a common region, a first sub-region, and fourth second sub-regions. The first sub-region may overlap the common region. The four second sub-regions may overlap the common region.

All the regions RG11, RG12, RG13, RG14, RG21, RG22, RG23, RG24, RG31, RG32, RG33, RG34, RG41, RG42, RG43, and RG44 of the test chart TCa may be referred to as the common region of the test chart TCa. The common region may have the first area and a first linear pattern of a first frequency. The area may refer to a partial area of the entire area of the test chart TCa, which is occupied by the corresponding region. The linear pattern may include a plurality of lines arbitrarily arranged depending on a type. The type may indicate a thickness (i.e., a frequency) of the corresponding lines. The linear pattern will be described in detail with reference to FIG. 3.

Some regions RG22, RG23, RG32, and RG33 of the test chart TCa may be referred to as the first sub-region of the test chart TCa. The first sub-region may have the second area and a second linear pattern of a second frequency. The second area may be smaller than the first area corresponding to the common region. The second frequency may be higher than the first frequency corresponding to the common region. The second linear pattern may be implemented by scaling down the first linear pattern. For example, that a frequency being relatively high may indicate that a thickness of lines occupying the corresponding region is relatively thin.

The region RG11 of the test chart TCa may be referred to as the second sub-region of the test chart TCa. The regions RG14, RG41, and RG44 of the test chart TCa may be also referred to as the second sub-regions of the test chart TCa, respectively. The second sub-region may have the third area and a third linear pattern of a third frequency. The third area may be smaller than the second area corresponding to the first sub-region. The third frequency may be higher than the second frequency corresponding to the first sub-region. The third linear pattern may be implemented by scaling down the second linear pattern.

Figure 3:
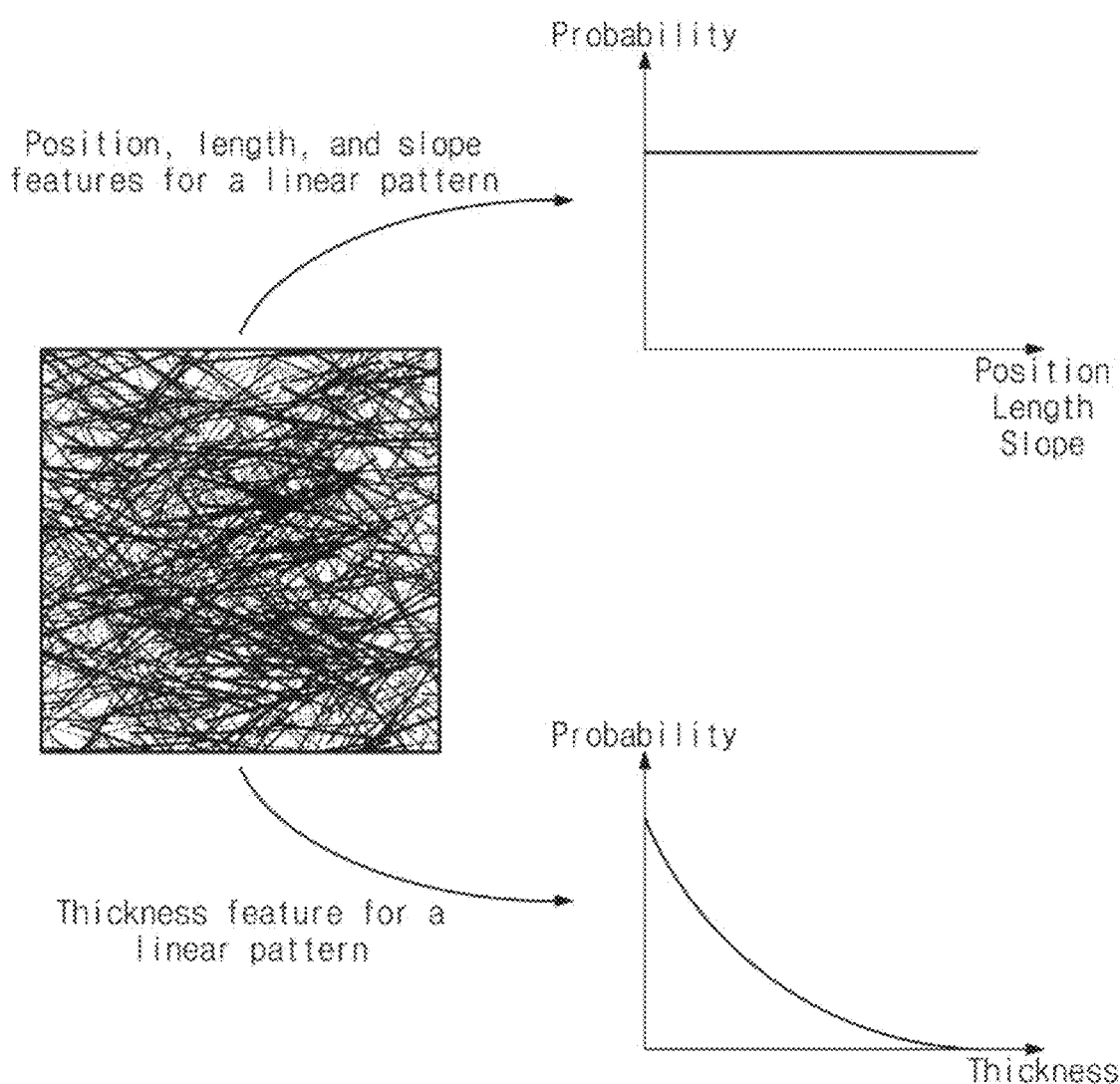
FIG. 3 is a diagram illustrating a linear pattern of a test chart of FIG. 1 according to some embodiments.

FIG. 3 is a diagram describing a linear pattern of a test chart of FIG. 1 according to some embodiments. A linear pattern applied to the test chart TC will be described in detail with reference to FIGS. 1 and 3. The linear pattern may be applied to the entire area or a partial area of the test chart TC. For example, the linear pattern may be applied to the common region, the first sub-region, and the second sub-region of the test chart TCa of FIG. 2.

The linear pattern may include a plurality of lines. Each of the plurality of lines may have an arbitrary position, an arbitrary length, an arbitrary slope, and an arbitrary thickness.

Referring to a position, length, and slope graph of the linear pattern, a horizontal axis denotes a position, a length, and a slope, and a vertical axis denotes a probability.

The probability of the position of the linear pattern may be uniform. For example, the plurality of lines in the linear pattern may occupy arbitrary coordinates in a region that the linear pattern occupies. The probability that lines occupy arbitrary coordinates may be uniform regardless of the position in the region that the linear pattern occupies.

The probability of the length of the linear pattern may be uniform. For example, the plurality of lines in the linear pattern may have arbitrary lengths. The probability that a line has an arbitrary length may be uniform regardless of whether the length of the line is short or long.

The probability of the slope of the linear pattern may be uniform. For example, the plurality of lines in the linear pattern may have an arbitrary slope. When a horizontal direction is a reference axis, a line in the linear pattern may have a slope corresponding to an arbitrary angle between 0 degree and 360 degrees. For example, the probability that a line in the linear pattern has an arbitrary slope may be uniform.

Referring to a thickness graph of the linear pattern, a horizontal axis denotes a thickness, and a vertical axis denotes a probability.

The probability of the thickness of the linear pattern may exponentially decrease. For example, the plurality of lines in the linear pattern may have various thicknesses. The linear pattern may include a relatively high number of thick lines and a relatively low number of thick lines. The probability that the thickness of the line in the linear pattern is at a certain thickness may exponentially decrease as the thickness decreases.

As described above, according to embodiments, a linear pattern including a plurality of lines having various positions, lengths, slopes, and thicknesses may be applied to a test chart. The linear pattern may be implemented under the extreme assumption of a situation where the color distortion easily occurs in an actual use environment of an image sensor. The test chart including the linear pattern may be used as an object of an image that is used to assess color distortion of an image sensor.

Figure 4:
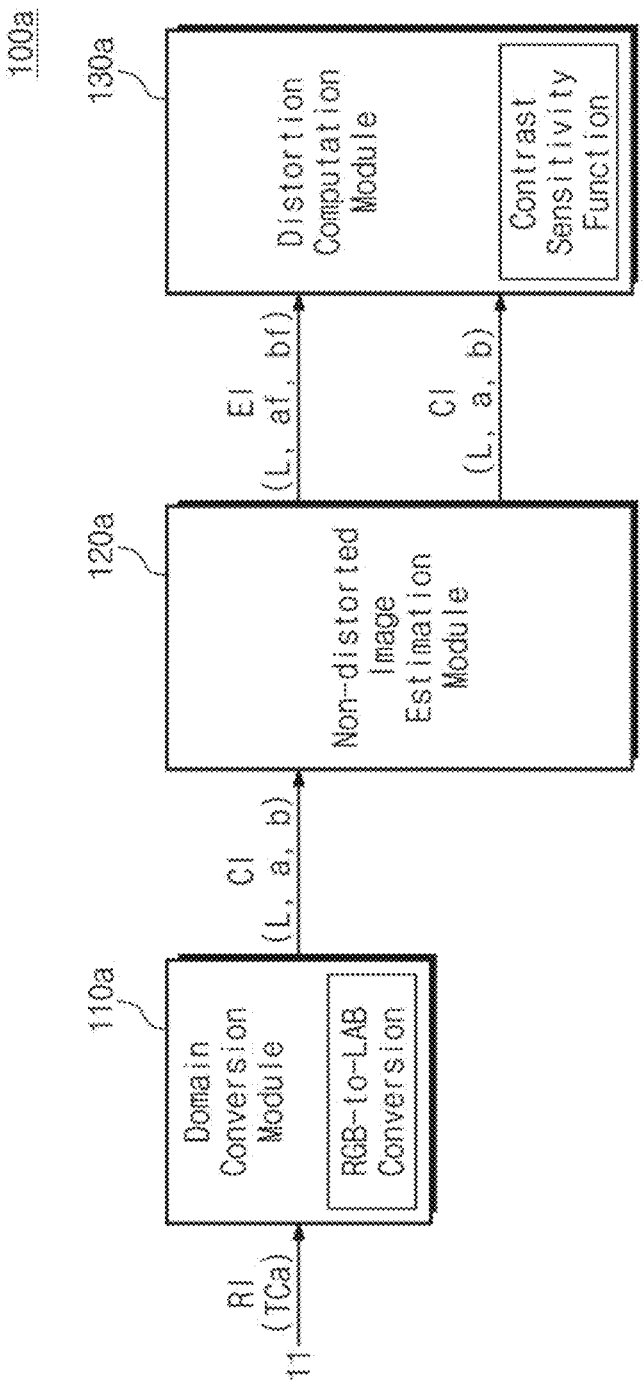
FIG. 4 is a block diagram illustrating an assessment device according to some embodiments.

FIG. 4 is a block diagram illustrating an assessment device according to some embodiments. Referring to FIG. 4, an assessment device 100a according to some embodiments is illustrated. The assessment device 100a may correspond to the assessment device 100 of FIG. 1. The assessment device 100a may communicate with the image sensor 11. The assessment device 100a may assess a level of color distortion of the image sensor 11, based on the raw image data RI corresponding to the test chart TCa of FIG. 2. For example, the color distortion may include the false color.

The assessment device 100a may include a domain conversion module 110a, a non-distorted image estimation module 120a, and a distortion computation module 130a. In some embodiments, the domain conversion module 110a, the non-distorted image estimation module 120a, and the distortion computation module 130a may be implemented with software modules. However, embodiments are not limited thereto.

The domain conversion module 110a may receive the raw image data RI from the image sensor 11 (e.g., through the input buffer of the assessment device 100 of FIG. 1). The raw image data RI may be acquired by capturing the test chart TCa by the image sensor 11. The domain conversion module 110a may generate conversion image data CI based on the color domain conversion of the raw image data RI. The color domain of the conversion image data CI may be different from the color domain of the raw image data RI.

In some embodiments, the domain conversion module 110a may perform RGB-to-LAB conversion. The RGB-to-LAB conversion may be performed to convert the color domain from the RGB domain to the LAB domain.

The RGB domain may have a first color value, a second color value, and a third color value. For example, the first color value may indicate the degree to which a red color is dominant. The second color value may indicate the degree to which a green color is dominant. The third color value may indicate the degree to which a blue color is dominant.

The LAB domain may have a brightness value "L", a first chrominance value "a", and a second chrominance value "b". The brightness value "L" may indicate brightness independent of the color. The first chrominance value "a" may indicate a difference between the red color and the green color. As the first chrominance value 'a" increases, an image may become closer to the red color, and as the first chrominance value 'a" decreases, an image may become closer to the green color. The second chrominance value "b" may indicate a difference between the yellow color and the blue color. As the second chrominance value 'b" increases, an image may become closer to the yellow color, and as the second chrominance value 'b" decreases, an image may become closer to the blue color.

For example, the domain conversion module 110a may generate the conversion image data CI having the brightness value "L", the first chrominance value "a", and the second chrominance value "b", based on the raw image data RI having the first color value, the second color value, and the third color value.

The non-distorted image estimation module 120a may receive the conversion image data CI from the domain conversion module 110a. The non-distorted image estimation module 120a may generate estimation image data EI by estimating a non-distorted image based on the conversion image data CI. The non-distorted image estimation module 120a may provide the estimation image data EI and the conversion image data CI to the distortion computation module 130a.

For example, even though the conversion image data CI experience the change in the color domain, the conversion image data CI may have the color distortion according to the performance of the image sensor 11 as it is. The estimation image data EI may be obtained by estimating a color distortion-free image based on the conversion image data CI.

In some embodiments, the non-distorted image estimation module 120a may estimate a false color-free image. For example, the test chart TCa that is used to assess a false color level may not have a color. In the case where there is no color distortion of the image sensor 11, the first chrominance value "a" and the second chrominance value "b" in the conversion image data CI may be uniform in pixels corresponding to a captured scene.

The non-distorted image estimation module 120a may determine a first fitted chrominance value af and a second fitted chrominance value bf by adjusting (i.e., fitting) the first chrominance value "a" and the second chrominance value "b" such that unusual values (e.g., outlier values) that are different in trend from values of adjacent pixels are similar to the values of the adjacent pixels.

The non-distorted image estimation module 120a may generate the estimation image data EI having the brightness value "L", the first fitted chrominance value af, and the second fitted chrominance value bf, as an estimated non-distorted image. The brightness value "L" of the estimation image data EI may be equal to the brightness value "L" of the conversion image data CI. The non-distorted image estimation module 120a will be described in detail with reference to FIG. 5.

The distortion computation module 130a may receive the estimation image data EI and the conversion image data CI from the non-distorted image estimation module 120a. The distortion computation module 130a may assess the color distortion (e.g., a false color) of the image sensor 11, based on the estimation image data EI and the conversion image data CI.

In some embodiments, the distortion computation module 130a may assess the color distortion of the image sensor 11 by using a contrast sensitivity function CSF. The contrast sensitivity function CSF may be a function of mathematically modeling sensitivities of the brightness value "L", the first chrominance value "a", and the second chrominance value "b" based on the visual perception characteristic of the person for each frequency band of a visible light. The distortion computation module 130a may assess the color distortion level by applying a weighted sum of the contrast sensitivity function CSF to difference values of the estimation image data EI and the conversion image data CI. As the contrast sensitivity function CSF is reflected, an assessed level of the color distortion may reflect the visual perception characteristic of the person objectively and quantitatively. The distortion computation module 130a will be described in detail with reference to FIG. 6.

Figure 5:
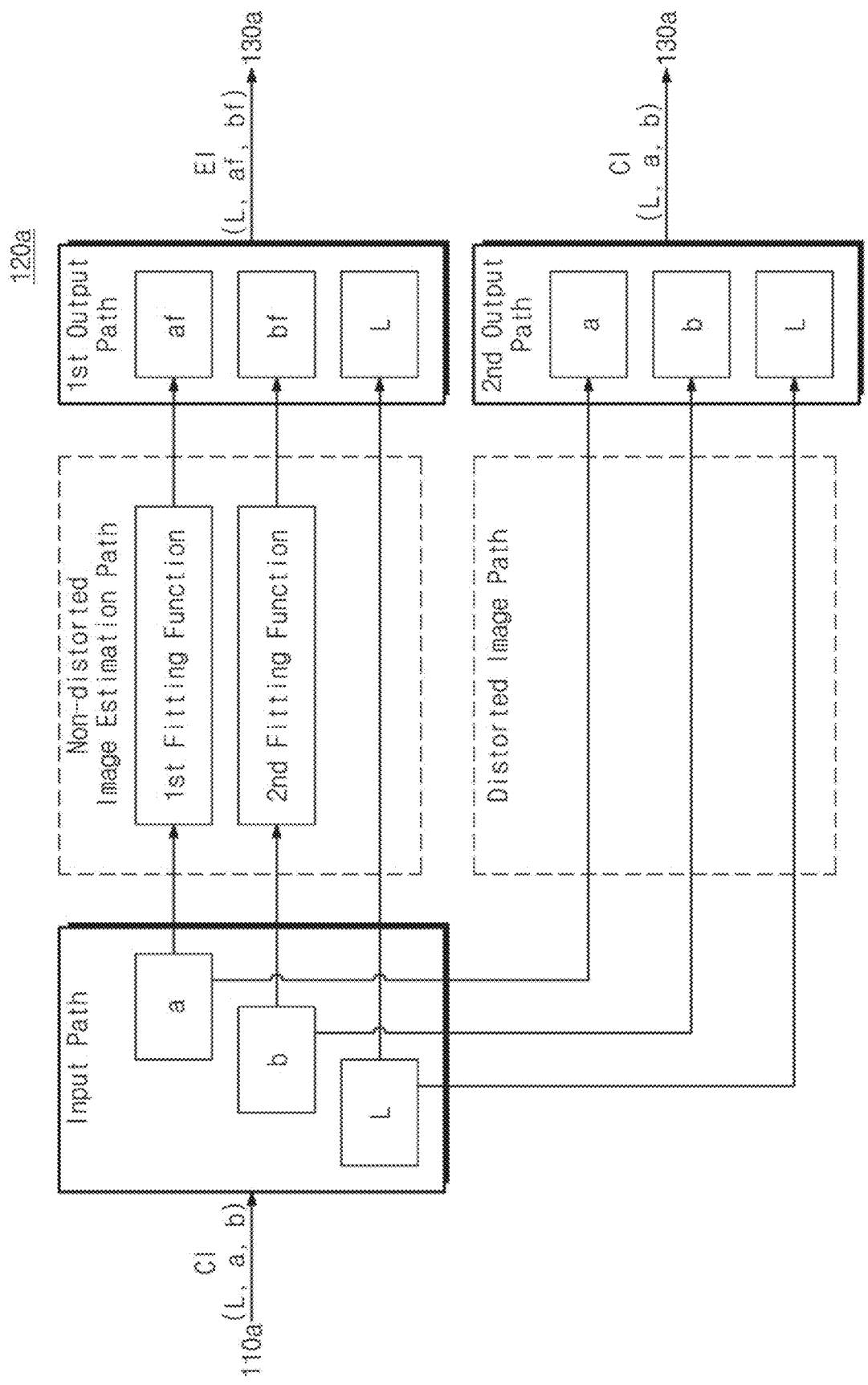
FIG. 5 is a block diagram illustrating a non-distorted image estimation module of FIG. 4 in detail, according to some embodiments.

FIG. 5 is a block diagram illustrating a non-distorted image estimation module of FIG. 4 in detail, according to some embodiments. Referring to FIGS. 4 and 5, the non-distorted image estimation module 120a may communicate with the domain conversion module 110a and the distortion computation module 130a.

The non-distorted image estimation module 120a may include an input path, a non-distorted image estimation path, a first output path, a distorted image path, and a second output path.

The input path may receive the conversion image data CI from the domain conversion module 110a. The conversion image data CI may have the brightness value "L", the first chrominance value "a", and the second chrominance value "b". The conversion image data CI may have the color distortion corresponding to the false color. The input path may provide the conversion image data CI to the non-distorted image estimation path and the distorted image path.

The non-distorted image estimation path may receive the conversion image data CI from the input path. The non-distorted image estimation path may include a first fitting function and a second fitting function. The first fitting function may determine the first fitted chrominance value af by fitting outlier values of the first chrominance value "a" of the conversion image data CI.

For example, the first chrominance value "a" may include many points corresponding to pixels corresponding to a scene. The first fitting function may estimate a plane by using many points on the space of the first chrominance value "a". The first fitting function may fit some points (i.e., outlier values) excessively being outside of the estimated plane, so as to be similar to the estimated plane. The first fitting function may determine a result of fitting the outlier values in the first chrominance value "a" as the first fitted chrominance value af.

As in the above description, the second fitting function may determine the second fitted chrominance value bf by fitting outlier values of the second chrominance value "b" of the conversion image data CI. For example, the non-distorted image estimation path may refer to a path for estimating a non-distorted image by fitting the first chrominance value "a" and the second chrominance value "b" corresponding to the color distortion in the case of the false color.

The non-distorted image estimation path may not perform separate computation or processing on the brightness value "L". The non-distorted image estimation path may provide the brightness value "L", the first fitted chrominance value af, and the second fitted chrominance value bf to the first output path. The first output path may provide the distortion computation module 130a with the estimation image data EI having the brightness value "L", the first fitted chrominance value af, and the second fitted chrominance value bf.

The distorted image path may receive the conversion image data CI from the input path. The distorted image path may not perform separate computation or processing on the brightness value "L", the first chrominance value "a", and the second chrominance value "b" of the conversion image data CI. For example, the distorted image path may refer to a path for transferring the conversion image data CI with the color distortion without modification. The distorted image path may provide the brightness value "L", the first chrominance value "a", and the second chrominance value "b" to the second output path. The second output path may provide the distortion computation module 130a with the conversion image data CI having the brightness value "L", the first chrominance value "a", and the second chrominance value "b".

Figure 6:
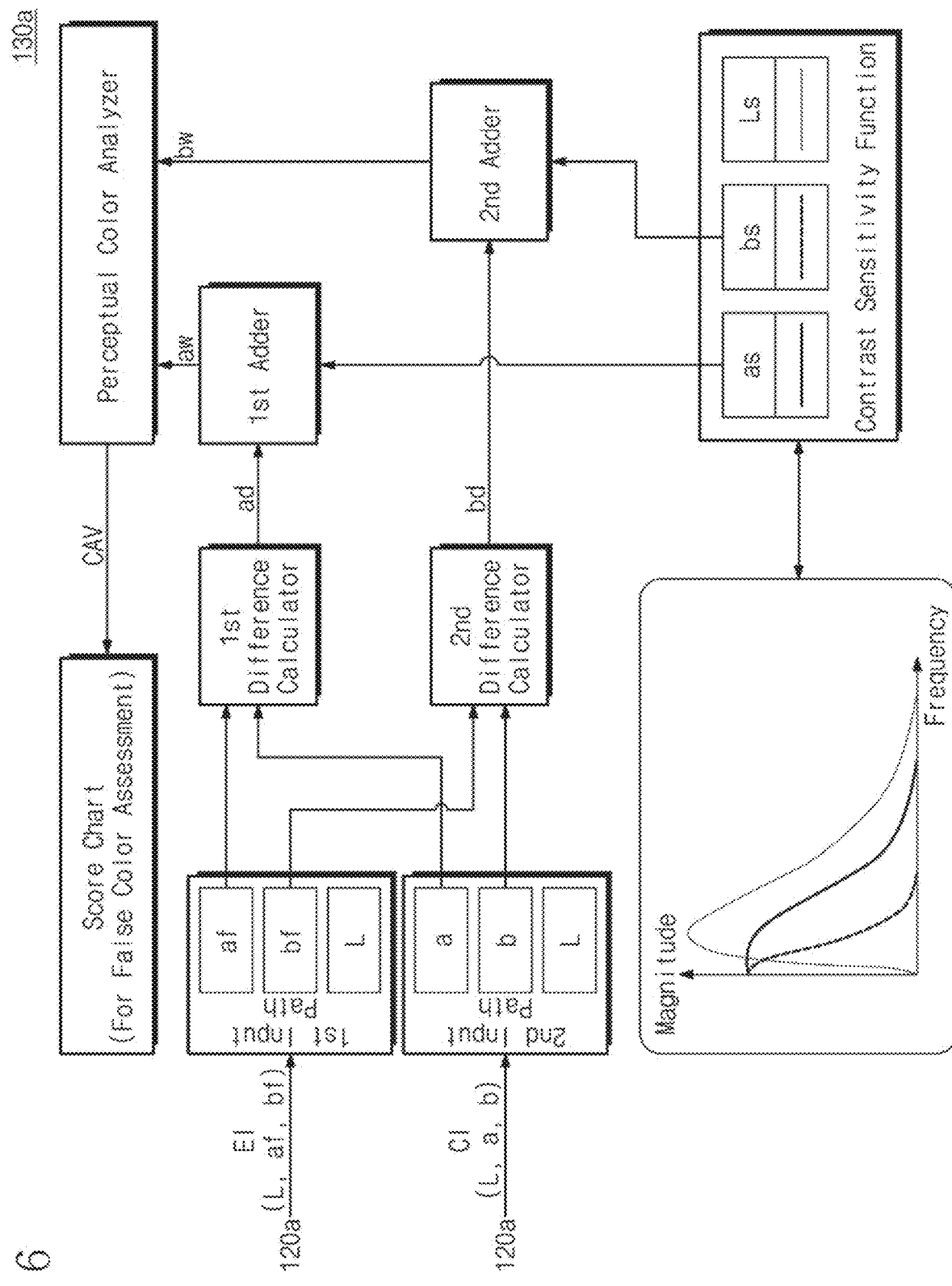
FIG. 6 is a block diagram illustrating a distortion computation module of FIG. 4 in detail, according to some embodiments.

FIG. 6 is a block diagram illustrating a distortion computation module of FIG. 4 in detail, according to some embodiments. Referring to FIGS. 4 and 6, the distortion computation module 130a may communicate with the non-distorted image estimation module 120a.

The distortion computation module 130a may include a first input path, a second input path, a first difference calculator, a second difference calculator, the contrast sensitivity function CSF, a first adder, a second adder, a perceptual color analyzer, and a score chart.

The first input path may receive the estimation image data EI from the non-distorted image estimation module 120a. The estimation image data EI may include the brightness value "L", the first fitted chrominance value af, the second fitted chrominance value bf. The first input path may provide the first fitted chrominance value af to the first difference calculator. The first input path may provide the second fitted chrominance value bf to the second difference calculator.

The second input path may receive the conversion image data CI from the non-distorted image estimation module 120a. The conversion image data CI may include the brightness value "L", the first chrominance value "a", and the second chrominance value "b". The second input path may provide the first chrominance value "a" to the first difference calculator. The second input path may provide the second chrominance value "b" to the second difference calculator.

The first difference calculator may receive the first fitted chrominance value af from the first input path. The first difference calculator may receive the first chrominance value "a" from the second input path. The first difference calculator may determine a first calculated difference value ad based on a difference between the first fitted chrominance value af and the first chrominance value "a". As a magnitude of the first calculated difference value ad increases, the color distortion for the first chrominance value "a" may become greater in the image sensor 11. The first difference calculator may provide the first calculated difference value ad to the first adder.

The second difference calculator may receive the second fitted chrominance value bf from the first input path. The second difference calculator may receive the second chrominance value "b" from the second input path. The second difference calculator may determine a second calculated difference value bd based on a difference between the second fitted chrominance value bf and the second chrominance value "b". As a magnitude of the second calculated difference value bd increases, the color distortion for the second chrominance value "b" may become greater in the image sensor 11. The second difference calculator may provide the second calculated difference value bd to the second adder.

The contrast sensitivity function CSF may be a function of mathematically modeling sensitivities of the brightness value "L", the first chrominance value "a", and the second chrominance value "b" based on the visual perception characteristic of the person for each frequency. The contrast sensitivity function CSF may be used to allocate a weight based on the visual perception characteristic upon assessing the color distortion. The contrast sensitivity function CSF may include a brightness sensitivity value Ls, a first chrominance sensitivity value as, and a second chrominance sensitivity value bs.

In a graph corresponding to the contrast sensitivity function CSF, a horizontal axis denotes a frequency, and a vertical axis denotes a magnitude. A solid line indicates a waveform of the brightness sensitivity value Ls. A bold solid line indicates the first chrominance sensitivity value as. A dashed line indicates the second chrominance sensitivity value bs. As a magnitude of each of the brightness sensitivity value Ls, the first chrominance sensitivity value as, and the second chrominance sensitivity value bs increases, a magnitude of sensitivity visually perceived by the person in a frequency band of a visible light may become more dominant.

The first chrominance sensitivity value as of the contrast sensitivity function CSF may be provided to the first adder. The second chrominance sensitivity value bs of the contrast sensitivity function CSF may be provided to the second adder.

The first adder may receive the first calculated difference value ad from the first difference calculator. The first adder may receive the first chrominance sensitivity value as from a memory device in which the contrast sensitivity function CSF is stored. The first adder may determine a first weighted sum value aw based on a weighted sum of the first calculated difference value ad and the first chrominance sensitivity value as. The first adder may provide the first weighted sum value aw to the perceptual color analyzer.

The second adder may receive the second calculated difference value bd from the second difference calculator. The second adder may receive the second chrominance sensitivity value bs from the memory device in which the contrast sensitivity function CSF is stored. The second adder may determine a second weighted sum value bw based on a weighted sum of the second calculated difference value bd and the second chrominance sensitivity value bs. The second adder may provide the second weighted sum value bw to the perceptual color analyzer.

The perceptual color analyzer may receive the first weighted sum value aw from the first adder. The perceptual color analyzer may receive the second weighted sum value bw from the second adder. The perceptual color analyzer may assess the color distortion of the image sensor 11 based on the first weighted sum value aw and the second weighted sum value bw.

For example, the perceptual color analyzer may determine a color analysis value CAV based on the first weighted sum value aw and the second weighted sum value bw. The color analysis value CAV may include information about a level of the color distortion (e.g., a false color) of the image sensor 11. The perceptual color analyzer may provide the color analysis value CAV to the score chart. In this case, the score chart may be a score chart for assessing a level of the false color.

The score chart may determine a score value based on the color analysis value CAV. The score value may indicate the level of the color distortion of the image sensor 11. For example, the score value may indicate the assessed false color level by using a numerical value or by using a character-based grade.

Figure 7:
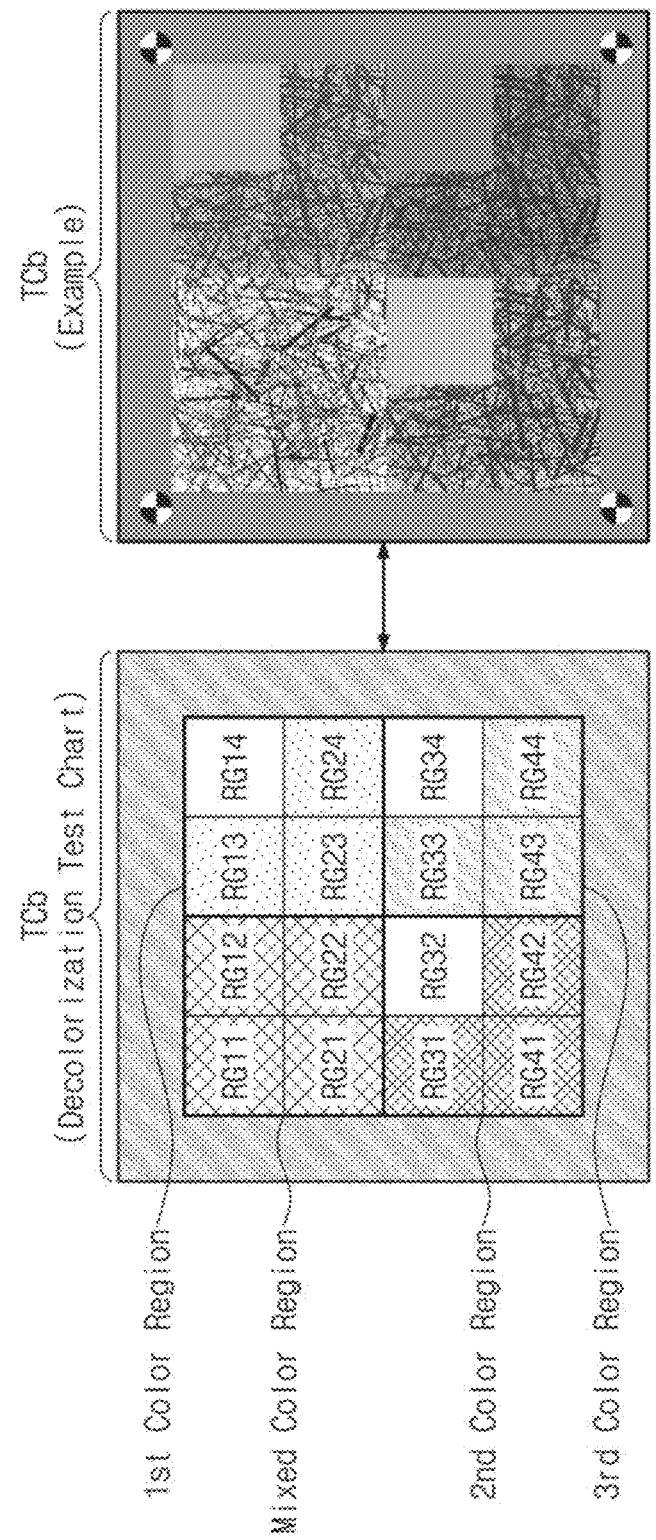
FIG. 7 is a diagram describing a test chart of FIG. 1, according to some embodiments.

FIG. 7 is a diagram describing a test chart of FIG. 1, according to some embodiments. A design example and an implementation example of a test chart TCb will be described with reference to FIGS. 1 and 7. The test chart TCb may be used to assess the decolorization. The test chart TCb may include backgrounds of various colors, lines of various colors, a linear pattern sub-region having a linear pattern, and a plane sub-region in which a pattern does not exist. The test chart TCb may correspond to one of examples of the test chart TC of FIG. 1. A characteristic of the linear pattern is similar to the characteristic of the linear pattern of FIG. 3, and thus, additional description will be omitted to avoid redundancy.

The design example of the test chart TCb describes a method of designing the test chart TCb. The implementation example of the test chart TCb illustrates the test chart TCb implemented as an example. The design example of the test chart TCb and the implementation example of the test chart TCb may correspond to each other.

The test chart TCb may include a plurality of regions RG11, RG12, RG13, RG14, RG21, RG22, RG23, RG24, RG31, RG32, RG33, RG34, RG41, RG42, RG43, and RG44 arranged in the row direction and the column direction. For better understanding, an example in which the test chart TCb includes 4 rows and 4 columns is illustrated, but embodiments are not limited thereto. In the test chart TCb, the number of rows and the number of columns may increase or decrease independently of each other.

In some embodiments, the test chart TCb may include a mixed color region, a first color region, a second color region, and a third color region. The mixed color region, the first color region, the second color region, and the third color region may not overlap each other.

The regions RG11, RG12, RG21, and RG22 of the test chart TCb may be referred to as the mixed color region of the test chart TCb. The mixed color region may have a linear pattern of a plurality of colors. For example, a background color of the mixed color region may not exist or may be a white color. Lines occupying the mixed color region may have various arbitrary colors. The linear pattern may include a plurality of lines in which probabilities of a position, a length, and a slope are uniform and a probability of a thickness exponentially decreases.

The regions RG13, RG14, RG23, and RG24 of the test chart TCb may be referred to as the first color region of the test chart TCb. The first color region may have a background of a first color. The first color region may include a first linear pattern sub-region and a first plane sub-region. The linear pattern sub-region may indicate a region that is occupied by the linear pattern. The plane sub-region may indicate a region in which the linear pattern does not exist and which is displayed by the first color of the background.

For example, the first color may be a yellow color. The regions RG13, RG23, and RG24 may constitute the first linear pattern sub-region. A color of lines according to the linear pattern occupying the first linear pattern sub-region may be a black color. The region RG14 may constitute the first plane sub-region.

The regions RG31, RG32, RG41, and RG42 of the test chart TCb may be referred to as the second color region of the test chart TCb. The second color region may have a background of a second color. The second color region may include a second linear pattern sub-region and a second plane sub-region.

For example, the second color may be a cyan color. The regions RG31, RG41, and RG42 may constitute the second linear pattern sub-region. A color of lines according to the linear pattern occupying the second linear pattern sub-region may be a black color. The region RG32 may constitute the second plane sub-region.

The regions RG33, RG34, RG43, and RG44 of the test chart TCb may be referred to as the third color region of the test chart TCb. The third color region may have a background of a third color. The third color region may include a third linear pattern sub-region and a third plane sub-region.

For example, the third color may be a green color. The regions RG33, RG43, and RG44 may constitute the third linear pattern sub-region. A color of lines according to the linear pattern occupying the third linear pattern sub-region may be a black color. The region RG34 may constitute the third plane sub-region.

Figure 8:
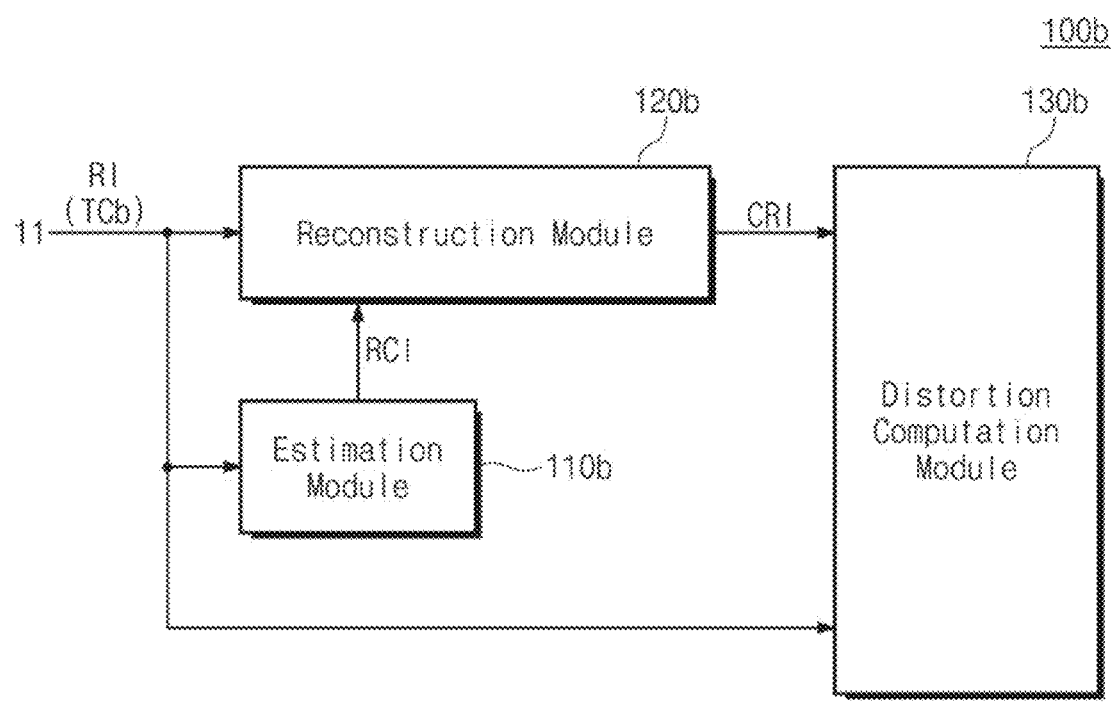
FIG. 8 is a block diagram of an assessment device according to some embodiments.

FIG. 8 is a block diagram of an assessment device according to some embodiments. Referring to FIG. 8, an assessment device 100b according to some embodiments is illustrated. The assessment device 100b may correspond to the assessment device 100 of FIG. 1. The assessment device 100b may communicate with the image sensor 11. The assessment device 100b may assess a level of color distortion of the image sensor 11, based on the raw image data RI corresponding to the test chart TCb of FIG. 7. For example, the color distortion may include the decolorization.

The assessment device 100b may include an estimation module 110b, a reconstruction module 120b, and a distortion computation module 130b. For example, the estimation module 110b, the reconstruction module 120b, and the distortion computation module 130b may be implemented with software modules.

The estimation module 110b may receive the raw image data RI from the image sensor 11 (e.g., through the input buffer of the assessment device 100 of FIG. 1). The raw image data RI may be acquired by capturing the test chart TCb by the image sensor 11. The estimation module 110b may include a reference chart corresponding to the test chart TCb. The reference chart may include information about colors used in the test chart TCb. The reference chart may include the color information that is not affected by the color distortion due to the image sensor 11 and is independent of luminance of an environment in which the test chart TCb is captured.

The estimation module 110b may generate replacement color information RCI based on the raw image data RI and the reference chart. The replacement color information RCI may be used to replace a color of the raw image data RI. The estimation module 110b may provide the replacement color information RCI to the reconstruction module 120b.

The reconstruction module 120b may receive the raw image data RI from the image sensor 11 (e.g., through the input buffer of the assessment device 100 of FIG. 1). The reconstruction module 120b may receive the replacement color information RCI from the estimation module 110b. The reconstruction module 120b may generate color reconstruction image data CRI by reconstructing the color of the raw image data RI based on the replacement color information RCI.

The color reconstruction image data CRI may compensate for the color distortion of the raw image data RI. For example, the color reconstruction image data CRI may be generated by estimating image data acquired by the image sensor 11 from which the decolorization is absent, by using the reference chart. The reconstruction module 120b may provide the color reconstruction image data CRI to the distortion computation module 130b.

The distortion computation module 130b may receive the color reconstruction image data CRI from the reconstruction module 120b. The distortion computation module 130b may receive the raw image data RI from the image sensor 11 (e.g., through the input buffer of the assessment device 100 of FIG. 1). The distortion computation module 130b may assess the color distortion (e.g., decolorization) of the image sensor 11 based on the color reconstruction image data CRI and the raw image data RI.

Figure 9:
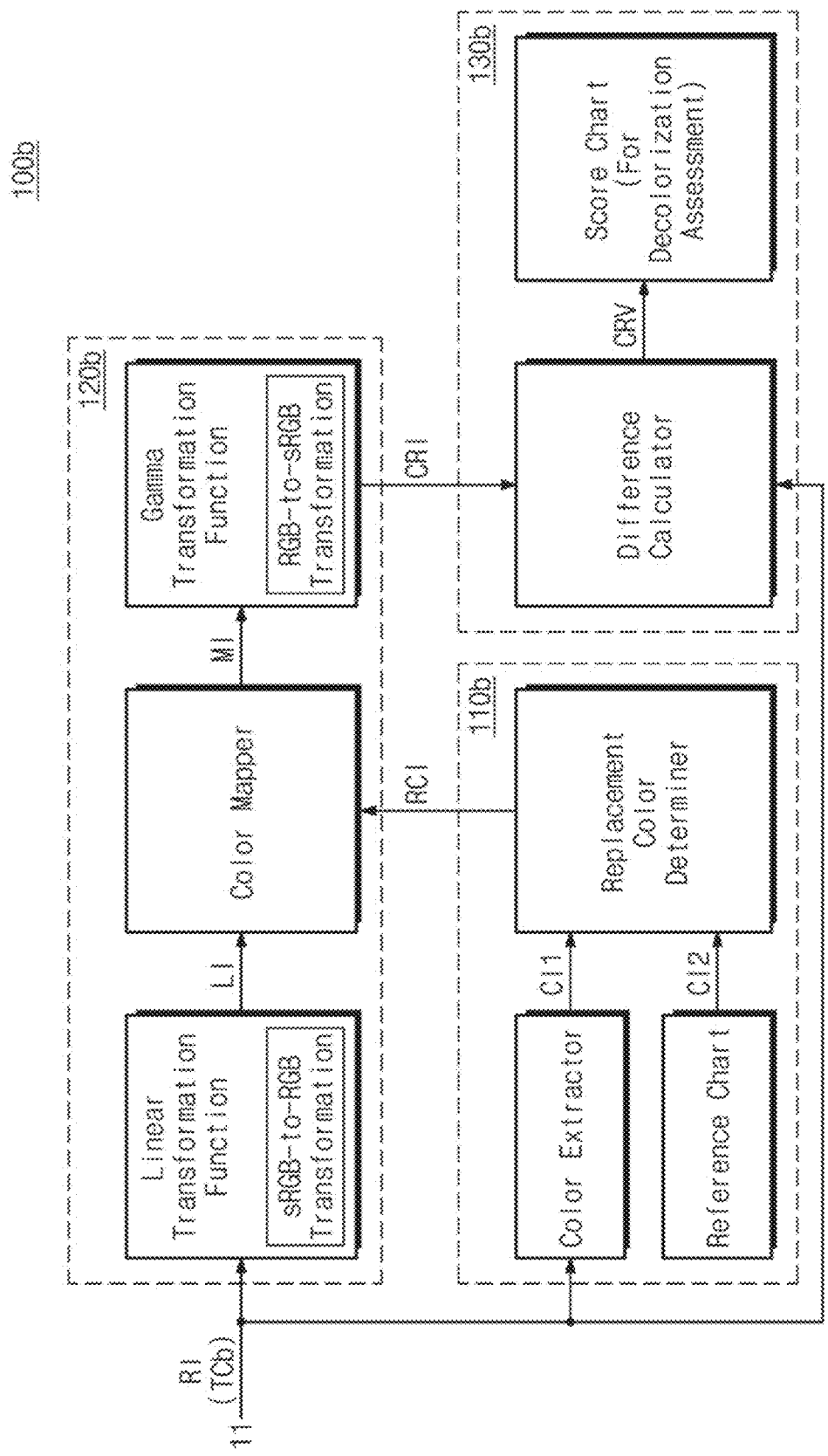
FIG. 9 is a block diagram illustrating an assessment device of FIG. 8 in detail, according to some embodiments.

FIG. 9 is a block diagram illustrating an assessment device of FIG. 8 in detail, according to some embodiments. Referring to FIGS. 8 and 9, the assessment device 100b may communicate with the image sensor 11. The assessment device 100b may assess a level of color distortion (e.g., decolorization) of the image sensor 11, based on the raw image data RI corresponding to the test chart TCb. The assessment device 100b may include the estimation module 110b, the reconstruction module 120b, and the distortion computation module 130b.

The estimation module 110b may include a color extractor, the reference chart, and a replacement color determiner. The color extractor may receive the raw image data RI from the image sensor 11. The color extractor may extract first color information CI1 based on the raw image data RI. The first color information CI1 may reflect the color distortion due to the image sensor 11.

The reference chart may include second color information CI2 corresponding to the color information used in the test chart TCb. The second color information CI2 may not be affected by the color distortion due to the image sensor 11 and may be independent of a change in luminance in an environment where the image sensor 11 captures the test chart TCb.

The replacement color determiner may receive the first color information CI1 from the color extractor. The replacement color determiner may receive the second color information CI2 from the reference chart. The replacement color determiner may generate the replacement color information RCI based on the first color information CI1 and the second color information CI2. The replacement color information RCI may be generated by estimating the color information acquired in the environment (e.g., the luminance environment) where the image sensor 11 captures the raw image data RI. The replacement color determiner may provide the replacement color information RCI to the reconstruction module 120b.

The reconstruction module 120b may include a linear transformation function, a color mapper, and a gamma transformation function. The linear transformation function may receive the raw image data RI from the image sensor 11. The linear transformation function may generate linear image data LI based on the linear transformation of the raw image data RI.

The linear transformation may be used to linearly transform a non-linear relationship between a strength and brightness of an electrical input signal in a display device. For example, the linear transformation may correspond to sRGB-to-RGB transformation in which a color space of the raw image data RI is transformed from an sRGB space to an RGB space.

The color mapper may receive the linear image data LI from the linear transformation function. The color mapper may receive the replacement color information RCI from the replacement color determiner of the estimation module 110b. The color mapper may generate mapping image data MI by mapping the replacement color information RCI on the background of the linear image data LI. The mapping image data MI may refer to image data in which the color distortion (e.g., decolorization) is compensated for.

The gamma transformation function may receive the mapping image data MI from the color mapper. The gamma transformation function may generate the color reconstruction image data CRI based on the gamma transformation of the mapping image data MI.

The gamma transformation may be used to transform a linear relationship of brightness for an input signal depending on a gamma curve. The gamma curve may indicate a non-linear relationship between strength of an electrical input signal and brightness visually perceived by the person in a display device. For example, the gamma transformation may correspond to RGB-to-sRGB transformation in which a color space of the mapping image data MI is transformed from an RGB space to an sRGB space. For example, the gamma transformation function may be the reciprocal to the linear transformation function. The gamma transformation function may provide the color reconstruction image data CRI to the distortion computation module 130b.

The distortion computation module 130b may include a difference calculator and a score chart. The difference calculator may receive the color reconstruction image data CRI from the reconstruction module 120b. The difference calculator may receive the raw image data RI from the image sensor 11. The calculator may determine a chrominance ratio value CRV based on the color reconstruction image data CRI and the raw image data RI. The chrominance ratio value CRV may include information about a level of color distortion (e.g., decolorization) of the image sensor 11. The difference calculator may provide the chrominance ratio value CRV to the score chart.

The score chart may determine a score value based on the chrominance ratio value CRV. The score value may indicate the level of the color distortion of the image sensor 11. For example, the score value may indicate the assessed decolorization level by using a numerical value or by using a character-based grade. In this case, the score chart may be a score chart for assessing the decolorization.

Figure 10:
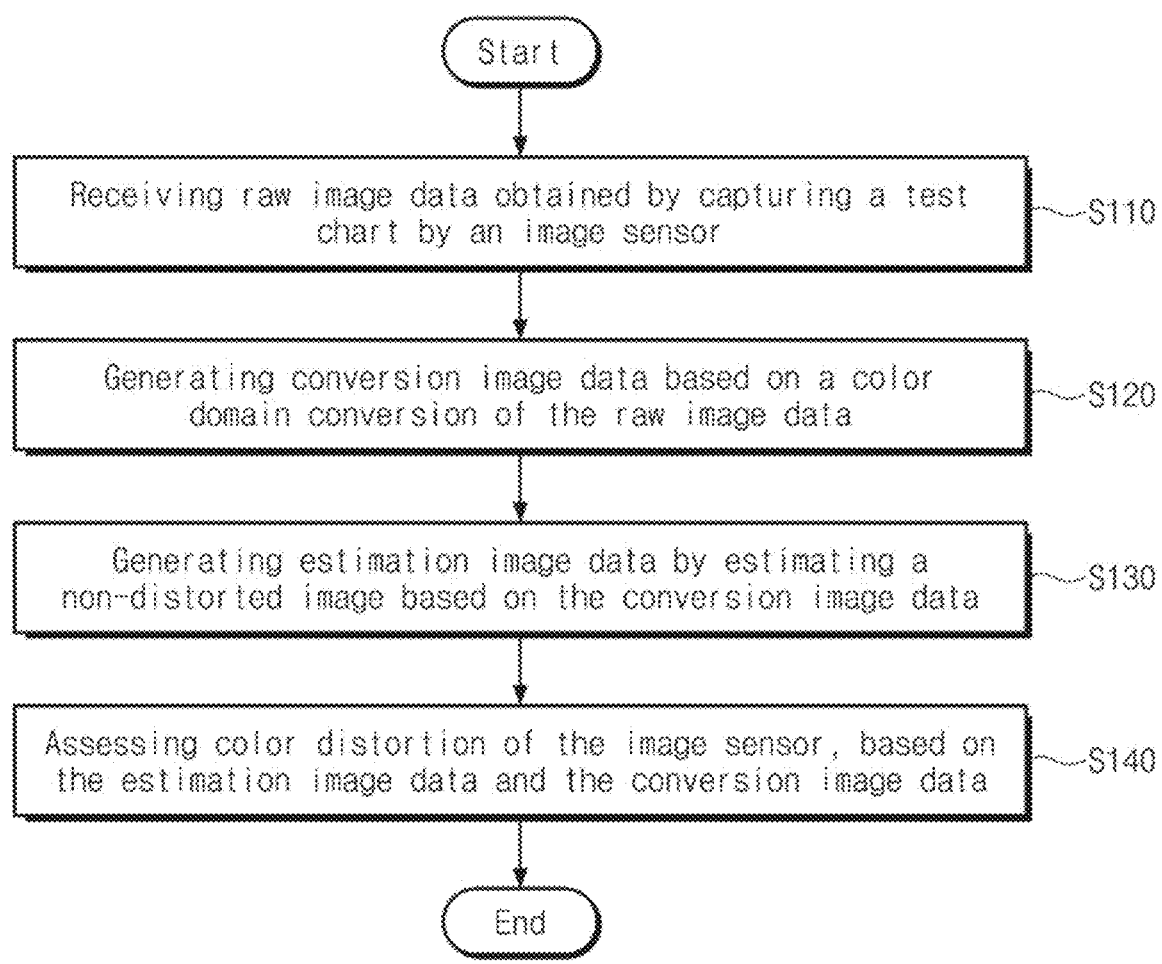
FIG. 10 is a flowchart describing a method of operating an assessment device according to some embodiments.

FIG. 10 is a flowchart describing a method of operating an assessment device according to some embodiments. A method of operating an assessment device will be described with reference to FIG. 10. The assessment device may communicate with an image sensor. The assessment device may include an input buffer and a processor. The assessment device may correspond to the assessment device 100 of FIG. 1 and the assessment device 100a of FIG. 4.

In operation S110, the input buffer of the assessment device may receive raw image data acquired by capturing a test chart from the image sensor.

In some embodiments the test chart may include a linear pattern in which probabilities of a position, a length, and a slope are uniform and a probability of a thickness exponentially decreases.

In some embodiments, the test chart may include a common region, a first sub-region, and a second sub-region. The common region may have the first area and a first linear pattern of a first frequency. The first sub-region may overlap the common region. The first sub-region may have the second area smaller than the first area and a second linear pattern of a second frequency higher than the first frequency. The second sub-region may overlap the common region. The second sub-region may have the third area smaller than the second area and a third linear pattern of a third frequency higher than the second frequency.

In operation S120, the processor of the assessment device may generate conversion image data based on the color domain transformation of the raw image data.

In some embodiments, operation S120 may include generating the conversion image data having a brightness value, a first chrominance value, and a second chrominance value, based on the color domain transformation of the raw image data having a first color value, a second color value, and a third color value.

In operation S130, the processor of the assessment device may generate estimation image data by estimating a non-distorted image based on the conversion image data.

In some embodiments, operation S130 may include determining a first fitted chrominance value by fitting outlier values of the first chrominance value of the conversion image data through a first fitting function, determining a second fitted chrominance value by fitting outlier values of the second chrominance value of the conversion image data through a second fitting function, and generating the estimation image data having a brightness value, a first fitted chrominance value, and a second fitted chrominance value.

In operation S140, the processor of the assessment device may assess color distortion of the image sensor based on the estimation image data and the conversion image data.

In some embodiments, the color distortion may include a false color.

In some embodiments, operation S140 may include determining a first calculated difference value based on a difference between the first fitted chrominance value of the estimation image data and the first chrominance value of the conversion image data, determining a second calculated difference value based on a difference between the second fitted chrominance value of the estimation image data and the second chrominance value of the conversion image data, determining a first weighted sum value based on a weighted sum of the first calculated difference value and a first chrominance sensitivity value of a contrast sensitivity function, determining a second weighted sum value based on a weighted sum of the second calculated difference value and a second chrominance sensitivity value of the contrast sensitivity function, and assessing the color distortion of the image sensor based on the first weighted sum value and the second weighted sum value.

In some embodiments, the processor of the assessment device may determine a score value indicating a level of the color distortion of the image sensor, based on the first weighted sum value and the second weighted sum value, by using the score chart.

Figure 11:
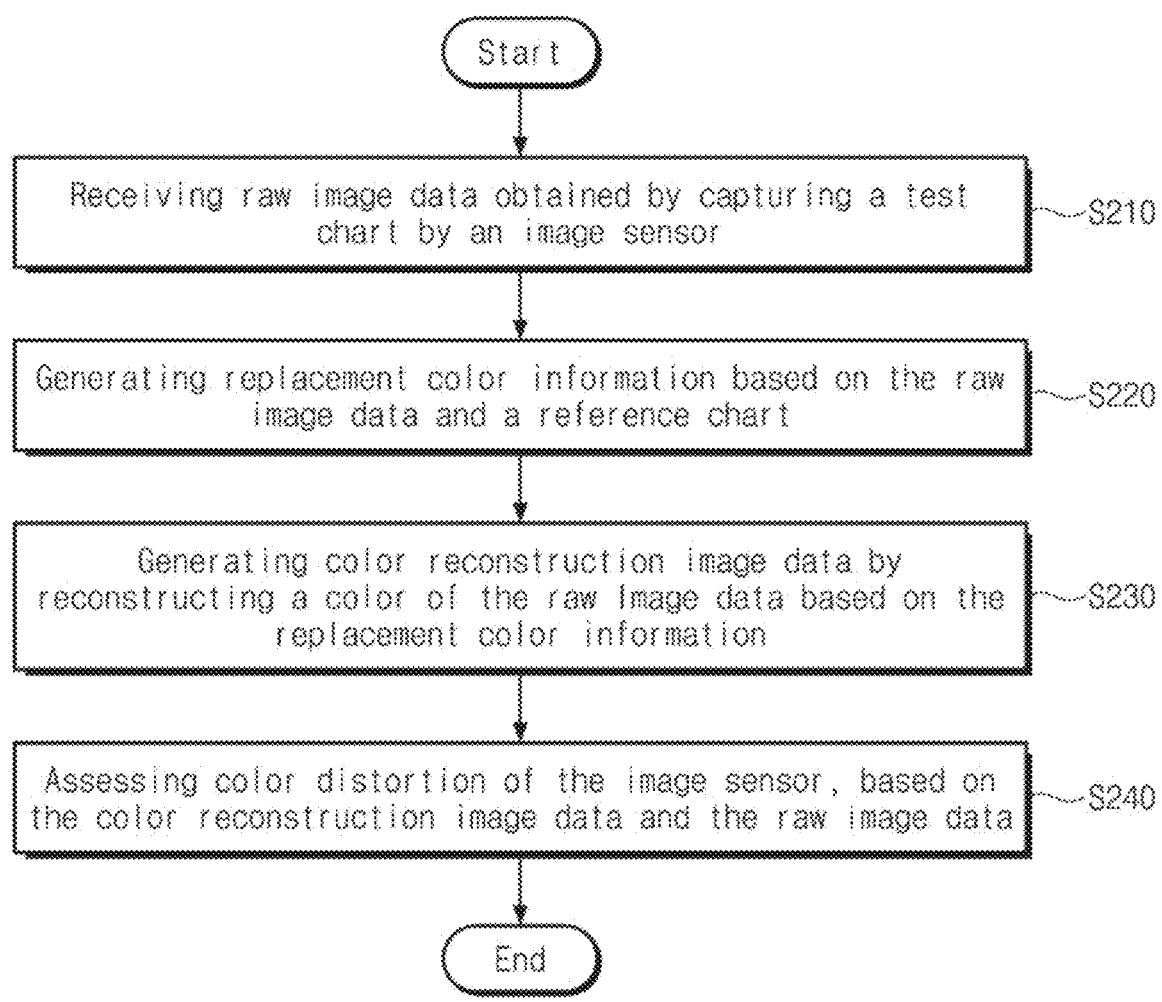
FIG. 11 is a flowchart describing a method of operating an assessment device according to some embodiments.

FIG. 11 is a flowchart describing a method of operating an assessment device according to some embodiments. A method of operating an assessment device will be described with reference to FIG. 11. The assessment device may communicate with an image sensor. The assessment device may include an input buffer and a processor. The assessment device may correspond to the assessment device 100 of FIG. 1 and the assessment device 100b of FIG. 8.

In operation S210, the input buffer of the assessment device may receive raw image data acquired by capturing a test chart through the image sensor.

In some embodiments the test chart may include a linear pattern in which probabilities of a position, a length, and a slope are uniform and a probability of a thickness exponentially decreases.

In some embodiments, the test chart may include a mixed color region, a first color region, a second color region, and a third color region. The mixed color region may have a linear pattern of a plurality of colors. The first color region may have a background of a first color and may include a first linear pattern sub-region and a first plane sub-region. The second color region may have a background of a second color and may include a second linear pattern sub-region and a second plane sub-region. The third color region may have a background of a third color and may include a third linear pattern sub-region and a third plane sub-region.

In operation S220, the processor of the assessment device may generate replacement color information based on the raw image data and a reference chart.

In some embodiments, operation S220 may include extracting first color information based on the raw image data, extracting second color information independent of a change in luminance with reference to the reference chart corresponding to the test chart, and determining the replacement color information based on the first color information and the second color information.

In operation S230, the processor of the assessment device may generate color reconstruction image data by reconstructing a color of the raw image data based on the color reconstruction image data.

In some embodiments, operation S230 may include generating linear image data based on linear transformation of the raw image data, generating mapping image data by mapping the replacement color information on a background of the linear image data, and generating the color reconstruction image data based on gamma transformation of the mapping image data.

In operation S240, the processor of the assessment device may assess color distortion of the image sensor based on the color reconstruction image data and the raw image data.

In some embodiments, the color distortion may include decolorization.

In some embodiments, operation S240 may include determining a chrominance ratio value based on the color reconstruction image data and the raw image data, and assessing the color distortion of the image sensor based on the chrominance ratio value.

In some embodiments, the processor of the assessment device may determine a score value indicating a level of the color distortion of the image sensor by using the score chart.

Figure 12:
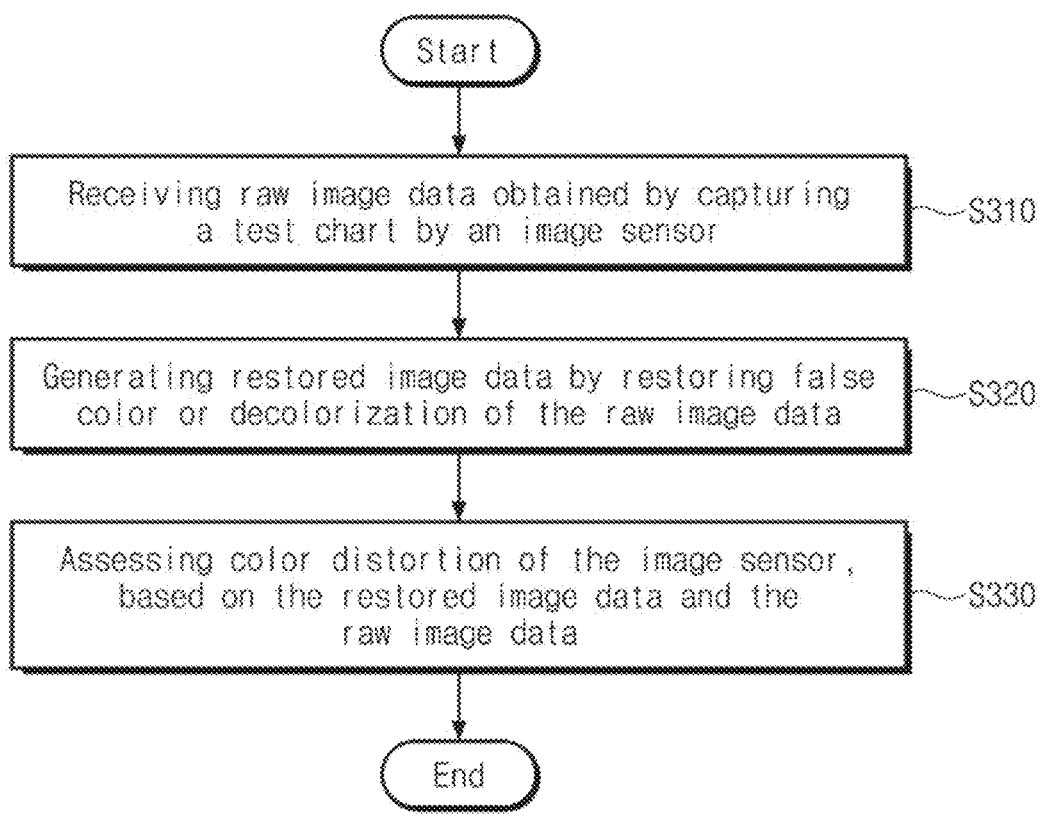
FIG. 12 is a flowchart describing a method of operating an assessment device according to some embodiments.

FIG. 12 is a flowchart describing a method of operating an assessment device according to some embodiments. A method of operating an assessment device will be described with reference to FIG. 12. The assessment device may communicate with an image sensor. The assessment device may include an input buffer and a processor. The assessment device may correspond to the assessment device 100 of FIG. 1, the assessment device 100a of FIG. 4, and the assessment device 100b of FIG. 8.

In operation S310, the input buffer of the assessment device may receive raw image data acquired by capturing a test chart through the image sensor. The test chart may include a linear pattern in which probabilities of a position, a length, and a slope are uniform and a probability of a thickness exponentially decreases.

In operation S320, the processor of the assessment device may generate restored image data by restoring a false color or decolorization of the raw image data.

In operation S330, the processor of the assessment device may assess color distortion of the image sensor based on the restored image data and the raw image data.

In some embodiments, the processor of the assessment device may assess the false color. For example, operation S320 may include generating conversion image data based on color domain transformation of the raw image data, and generating the restored image data by estimating a non-distorted image based on the conversion image data. The restored image data may correspond to the estimation image data EI of FIG. 4. Operation S330 may include assessing a level of the false color of the image sensor based on the restored image data and the conversion image data.

In some embodiments, the processor of the assessment device may assess the decolorization. For example, operation S320 may include generating replacement color information based on the raw image data and a reference chart, and generating the restored image data by reconstructing a color of the raw image data based on the replacement color information. The restored image data may correspond to the color reconstruction image data CRI of FIG. 8. Operation S330 may include assessing a level of the decolorization of the image sensor based on the restored image data and the raw image data.

Figure 13:
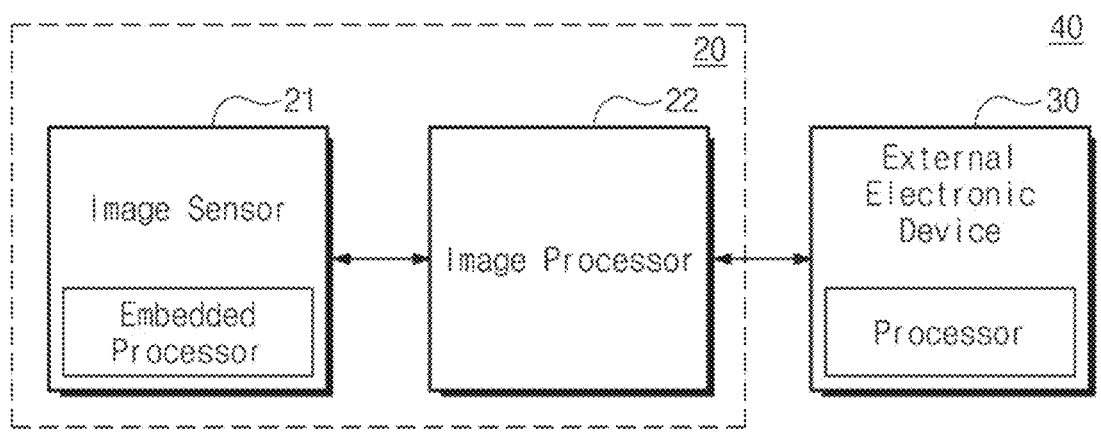
FIG. 13 is a block diagram illustrating an electronic system according to some embodiments.

FIG. 13 is a block diagram illustrating an electronic system according to some embodiments. Referring to FIG. 13, an electronic system 40 may include an electronic device 20 and an external electronic device 30. The electronic device 20 may include an image sensor 21 and an image processor 22.

The image sensor 21 may correspond to the image sensor 11 of FIG. 1. The image sensor 21 may include an embedded processor. The image processor 22 may process image data acquired from the image sensor 21. The electronic device 20 may be one of various electronic devices, which may include a camera module, such as, for example, a smartphone, a digital camera, and a tablet.

The external electronic device 30 may communicate with the electronic device 20 wiredly or wirelessly. The external electronic device 30 may include a processor. The processor of the external electronic device 30 may manage data received from the electronic device 20. The external electronic device 30 may be one of various electronic devices, which is capable of communicating the electronic device 20, such as a PC, a laptop, and a server.

According to some embodiments, an assessment device that assesses color distortion of the image sensor 21 may be implemented with at least one of various processors in the electronic system 40.

For example, the assessment device that assesses the color distortion of the image sensor 21 may be implemented on the embedded processor of the image sensor 21, may be implemented on the image processor 22 communicating with the image sensor 21, or may be implemented on the processor of the external electronic device 30 communicating with the electronic device 20 including the image sensor 21.

The assessment device that assesses the color distortion of the image sensor 21 may correspond to the assessment device 100 of FIG. 1, the assessment device 100a of FIG. 4, and the assessment device 100b of FIG. 8. The assessment device that assesses the color distortion of the image sensor 21 may perform the methods described with reference to FIGS. 10, 11, and 12.

According to an embodiment, a method of operating an assessment device assessing color distortion of an image sensor is provided.

In addition, according to embodiments, the image sensor may be enhanced based on a color distortion level assessed objectively and quantitatively. As such, the image sensor in which the color distortion is decreased and an image quality is improved may be provided.

While the present disclosure has been described with reference to embodiments thereof, it will be apparent to those of ordinary skill in the art that various changes and modifications may be made thereto without departing from the spirit and scope of the present disclosure as set forth in the following claims and their equivalents.

What is claimed is:

1. A method of operating an assessment device which communicates with an image sensor and comprises an input buffer and a processor, the method comprising:
   receiving, by the input buffer, raw image data from the image sensor that is configured to capture a test chart;
   generating, by the processor, conversion image data based on color domain transformation of the raw image data;
   generating, by the processor, estimation image data by estimating a non-distorted image based on the conversion image data; and
   assessing, by the processor, color distortion of the image sensor based on the estimation image data and the conversion image data.

2. The method of claim 1, wherein the color distortion comprises a false color.

3. The method of claim 1, wherein the test chart comprises a linear pattern, and
   wherein probabilities of the linear pattern having a position, a length, and a slope are uniform and a probability of the linear pattern having a thickness exponentially decreases as the thickness of the linear pattern decreases.

4. The method of claim 1, wherein the test chart comprises:
   a common region having a first area and a first linear pattern having a first frequency;
   a first sub-region overlapping the common region and having a second area smaller than the first area and a second linear pattern having a second frequency higher than the first frequency; and
   a second sub-region overlapping the common region and having a third area smaller than the second area and a third linear pattern having a third frequency higher than the second frequency.

5. The method of claim 1, wherein the generating of the conversion image data based the color domain transformation of the raw image data by the processor comprises:
   generating, by the processor, the conversion image data having a brightness value, a first chrominance value, and a second chrominance value, based on the color domain transformation of the raw image data having a first color value, a second color value, and a third color value.

6. The method of claim 5, wherein the generating of the estimation image data by the processor by estimating the non-distorted image based on the conversion image data comprises:
   determining, by the processor, a first fitted chrominance value by fitting outlier values of the first chrominance value of the conversion image data through a first fitting function;
   determining, by the processor, a second fitted chrominance value by fitting outlier values of the second chrominance value of the conversion image data through a second fitting function; and
   generating, by the processor, the estimation image data having the brightness value, the first fitted chrominance value, and the second fitted chrominance value.

7. The method of claim 6, wherein the assessing of the color distortion of the image sensor based on the estimation image data and the conversion image data by the processor comprises:

determining, by the processor, a first calculated difference value based on a difference between the first fitted chrominance value of the estimation image data and the first chrominance value of the conversion image data;

determining, by the processor, a second calculated difference value based on a difference between the second fitted chrominance value of the estimation image data and the second chrominance value of the conversion image data;

determining, by the processor, a first weighted sum value based on a weighted sum of the first calculated difference value and a first contrast sensitivity value of a contrast sensitivity function;

determining, by the processor, a second weighted sum value based on a weighted sum of the second calculated difference value and a second contrast sensitivity value of the contrast sensitivity function; and assessing, by the processor, the color distortion of the image sensor based on the first weighted sum value and the second weighted sum value.

8. The method of claim 7, wherein the assessing of the color distortion of the image sensor based on the first weighted sum value and the second weighted sum value by the processor comprises:

determining, by the processor, a score value corresponding to a level of the color distortion of the image sensor based on the first weighted sum value and the second weighted sum value, based on a score chart.

9. The method of claim 1, wherein the processor of the assessment device is implemented:

on an embedded processor included in the image sensor;

on an image processor configured to communicate with the image sensor; or on a processor included in a first electronic device configured to communicate with a second device comprising the image sensor.

* * * * *